(12) United States Patent
Lee

(10) Patent No.: US 10,502,326 B2
(45) Date of Patent: Dec. 10, 2019

(54) CONTROL VALVE AND POWER GENERATION SYSTEM INCLUDING THE SAME

(71) Applicant: DOOSAN HEAVY INDUSTRIES & CONSTRUCTION CO., LTD., Changwon-si, Gyeongsangnam-do (KR)

(72) Inventor: Hyun Chul Lee, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 15/956,764

(22) Filed: Apr. 19, 2018

(65) Prior Publication Data

US 2018/0340617 A1    Nov. 29, 2018

(30) Foreign Application Priority Data

May 23, 2017    (KR) ........................ 10-2017-0063414

(51) Int. Cl.
| | |
|---|---|
| F16K 5/02 | (2006.01) |
| F16K 27/02 | (2006.01) |
| F01K 11/02 | (2006.01) |
| F01D 17/14 | (2006.01) |

(52) U.S. Cl.
CPC ............. *F16K 5/02* (2013.01); *F01D 17/145* (2013.01); *F01K 11/02* (2013.01); *F16K 27/02* (2013.01)

(58) Field of Classification Search
CPC ... F16K 5/02; F16K 1/00; F01K 11/02; F01D 17/145
USPC .......... 60/646, 656, 657, 670–680; 251/63.4, 251/63.5, 63.6
See application file for complete search history.

(56) References Cited

U.S. PATENT DOCUMENTS

| | | | | |
|---|---|---|---|---|
| 3,241,322 | A * | 3/1966 | Strohmeyer, Jr. | F01D 17/18 411/959 |
| 3,908,701 | A * | 9/1975 | Dawawala | F16K 31/363 137/630.15 |
| 8,814,130 | B2 * | 8/2014 | Lelic | F16K 1/305 251/25 |
| 8,985,137 | B2 * | 3/2015 | Burgett | F16K 27/0281 137/315.28 |

(Continued)

FOREIGN PATENT DOCUMENTS

| | | |
|---|---|---|
| JP | 56-072204 A | 6/1981 |
| JP | 09-112809 A | 5/1997 |

*Primary Examiner* — Hoang M Nguyen
(74) *Attorney, Agent, or Firm* — Invenstone Patent, LLC

(57) ABSTRACT

A control valve includes a main body encasing a vapor channel configured to supply pressurized vapor from an evaporator to a turbine; an control unit, disposed in the vapor channel of the main body, for controlling an amount of vapor supplied to the turbine; and a load distributor, disposed between the control unit and the main body, for sealing the main body and for distributing to the main body a load applied to the control unit by the pressurized vapor in the vapor channel. The load distributor being fitted between the control unit and the main body enables the main body to be sealed, while distributing a load that has conventionally been concentrated on the cover and the cover studs. Since a load is distributed to the main body, a control valve for power generation systems can be designed with a smaller cover and smaller cover studs.

20 Claims, 5 Drawing Sheets

(56) References Cited

U.S. PATENT DOCUMENTS

2001/0032026 A1* 10/2001 Shigemasa ............. G05B 11/32
    700/53
2011/0011315 A1* 1/2011 Hayashi .................. F23C 9/003
    110/345

* cited by examiner

1300

CONTROL VALVE AND POWER GENERATION SYSTEM INCLUDING THE SAME

BACKGROUND OF THE INVENTION

Field of the Invention

The present invention relates to a control valve that controls the flow rate of vapor supplied to a turbine, and a power generation system including the control valve, and more particularly, to a control valve and power generation system in which a load is distributed.

Description of the Related Art

In general, a power generation system generates power by supplying thermal energy produced by burning fuel to a power cycle. High-temperature, high-pressure vapor supplied with thermal energy produced by a combustion reaction of fuel rotates turbine blades while passing through a turbine, so that power for generating electricity is generated by the system.

A control valve for a turbine is a valve that controls the flow rate of vapor that is supplied to a turbine. The control valve for a turbine is disposed between an evaporator and a turbine to be able to control power from the turbine by controlling the flow rate of vapor that is supplied to the turbine and to immediately stop the turbine in an emergency.

Contemporary control valves for a turbine are typically designed such that a supporting and protective structure covers the top of a main body of the control valve. The size of the cover is typically large, and the large cover is fixed to the main body with cover studs. Meanwhile, vapor inside the control valve is pressurized, which exerts pressure from within the main body, to include pressure applied to the cover and particularly to the cover studs. That is, the vapor pressure constitutes a structural load, which is primarily applied to the cover studs. Accordingly, a related art cover and cover stud are designed to withstand an excessive load applied by the pressurized vapor.

SUMMARY OF THE INVENTION

The present invention has been made in an effort to solve the problems of the related art. It is an object of the present invention to provide an improved control valve, and a power generation system including the control valve, which is capable of distributing a load to a main body of the control valve.

It is another object of the present invention to provide a control valve, and a power generation system including the same, which enables the design of a control valve having a smaller cover and smaller cover studs.

A control valve according to an aspect of the present invention may include a body encasing a vapor channel configured to supply pressurized vapor from an evaporator to a turbine; an control unit, disposed in the vapor channel of the main body, for controlling an amount of vapor supplied to the turbine; and a load distributor, disposed between the control unit and the main body, for sealing the main body and for distributing to the main body a load applied to the control unit by the pressurized vapor in the vapor channel.

The load distributor may include a load distribution assembly fitted to an inner side of the main body, to receive a load applied to the control unit and to distribute the received load to the main body; and a load return assembly disposed between the control unit and the load distribution assembly, to return to the control unit a portion of a load received by the load distribution assembly.

The load distribution assembly may include a first distribution member fitted to the main body; and a second distribution member, disposed in a space between an upper surface of the control unit and a bottom surface of the first distribution member, to receive a load applied to the control unit.

The first distribution member may be configured to distribute to the main body a load applied to the control unit, by transmitting to the main body a portion of a load applied to the control unit. The second distribution member may be configured to transmit the received load to the first distribution member. That is, the load distribution assembly may be configured to sequentially transmit a load applied to the control unit first to the second distribution member, then to the first distribution member, and then to the main body.

The first distribution member may have an outer side inserted into a surface of the inner side of the main body.

The control valve may further include at least one horizontal stud, inserted into an outer side of the first distribution member from an outer side of the main body, to fix the first distribution member to the main body.

The first and second distribution members may each have an annular shape.

With the second distribution member configured to transmit the received load to the first distribution member, the load return assembly may include a first return member, disposed on the first distribution member, to receive a portion of a load transmitted to the first distribution member; a second return member, disposed under the first return member, to receive from the first return member the portion of a load transmitted to the first distribution member; and a third return member, disposed between the first return member and the control unit, to receive from the second return member the portion of a load transmitted to the first distribution member.

The third return member may be configured to transmit the portion of a load transmitted to the first distribution member back to the control unit.

The first return member is configured to transmit the received portion of a load from the first distribution member to the second return member, and the second return member may be configured to transmit the received portion of a load from the first return member to the third return member.

The load distributor may further include at least one vertical stud inserted in the first return member and the second return member from a top of the first return member and fixing the first return member and the second return member.

The first return member may have a lower portion protruding inwardly, and the second return member may have an upper portion protruding outwardly. The second return member may have an inner side in contact with an outer side of the control unit, and an outer side in contact with an inner side of the first distribution member.

The first return member may be disposed in a space between the main body and the third return member, such that an inner side of first return member makes contact with an outer side of the third return member.

The third return member may have an inner side fitted to an outer side of the control unit.

The first, second, and third return members may each have an annular shape.

Each of the main body and the control unit may include an upward protrusion disposed toward a cover of the control valve, and the load distributor may be disposed between the upward protrusions of the main body and the control unit.

According to another aspect of the present invention, a power generation system may include an evaporator to produce vapor by receiving thermal energy and evaporating condensate water; a turbine to generate power for generating electricity by passing the produced vapor through the turbine; a condenser to condense the vapor having passed through the turbine; a pump to supply the evaporator with condensate water produced by the condenser; and the above control valve. The power generation system may further include a boiler to produce the thermal energy by expending a supplied fuel, wherein the supplied fuel is one of a fossil fuel and a nuclear fuel According to the present invention, a load distributor fitted between the control unit and the main body enables the distribution of a load that has conventionally been concentrated on the cover and the cover studs. A load is distributed to the main body, enabling a reduction in the respective sizes of the cover and the cover studs.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
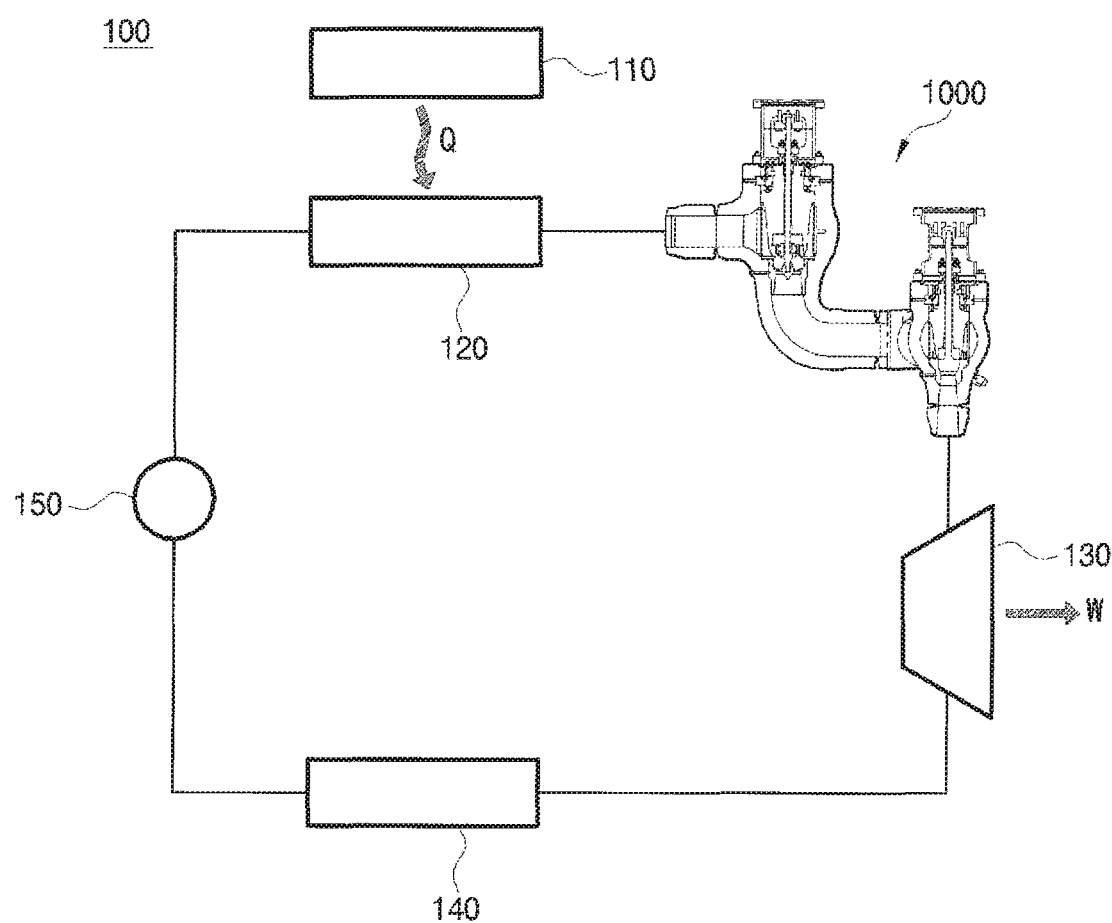
FIG. 1 is a block diagram of a power generation system according to an embodiment of the present invention.

The present invention may be modified in various ways and implemented by various exemplary embodiments, so that specific exemplary embodiments are shown in the drawings and will be described in detail. However, it is to be understood that the present invention is not limited to the specific exemplary embodiments, but includes all modifications, equivalents, and substitutions included in the spirit and the scope of the present invention.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Hereinafter, exemplary embodiments of the present invention will be described in detail with reference to the accompanying drawings. It should be noted that like components are indicated by like reference numerals. Description of functions and configurations that may make the subject matter of the present invention unclear is omitted. Similarly, some components are exaggerated or schematically shown in the drawings.

FIG. 1 shows the structure of a power generation system 100 according to an embodiment of the present invention.

Referring to FIG. 1, the power generation system 100 includes a boiler 110, an evaporator 120, a turbine 130, a condenser 140, a pump 150, and a control valve 1000. The boiler 110 produces thermal energy Q by expending (e.g., burning) fuel supplied from an external fuel source (not shown).

When the power generation system 100 is a thermal power generation system, the fuel may be fossil fuel such as coal or oil and the boiler 110 may be a heating furnace of a thermal power generation facility. When the power generation system 100 is a nuclear power generation system, the fuel may be nuclear fuel such as uranium or plutonium and the boiler 110 may be a nuclear reactor of a nuclear power generation facility. However, these are only examples and it should be understood that the power generation system 100 according to the embodiment of the present invention can be applied to other power generation systems.

The evaporator 120 receives the thermal energy Q from the boiler 110 and evaporates condensate water. The turbine 130 passes the vapor produced by the evaporator 120 through the turbine 130 such that turbine blades (not shown) are rotated, thereby generating power W for generating electricity.

The condenser 140 condenses the vapor that has passed through the turbine 130 into liquid water. The pump 150 pressurizes the condensate water to supply the condensate water produced through the condenser 140 to the evaporator 120. As the pump 150 supplies the condensate water to the evaporator 120, one power cycle is completed. Repeating this process results in power cycles for generating power.

The control valve 1000, which is disposed between the evaporator 120 and the turbine 130, receives the vapor produced through the evaporator 120 and controls the flow rate of the vapor that is supplied to the turbine 130. Accordingly, it is possible to control power from the turbine 130 and immediately stop the turbine 130 in an emergency.

The control valve 1000 will be described in detail.

Figure 2:
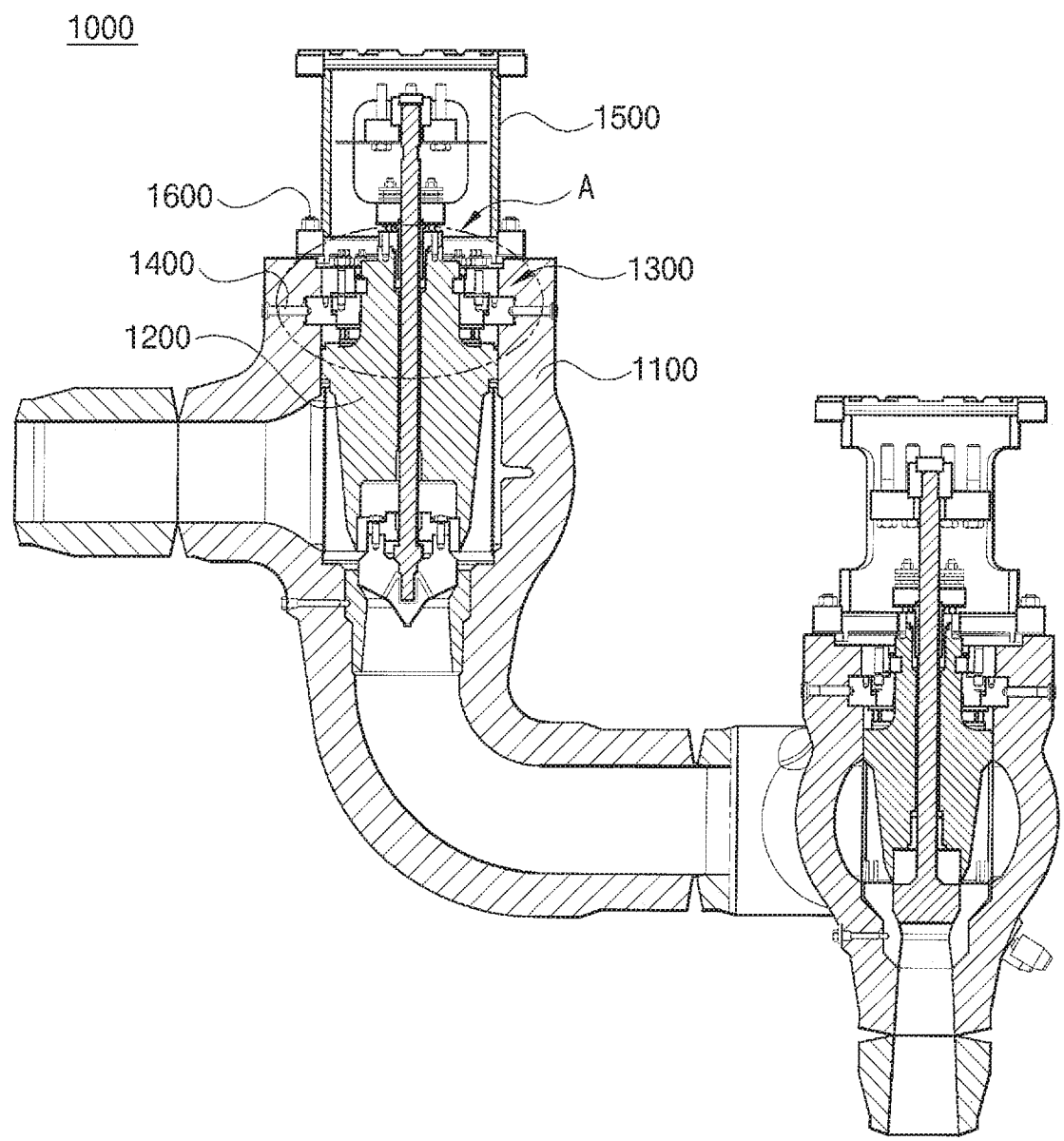
FIG. 2 is a cross-sectional view of the control valve of FIG. 1.

FIG. 2 shows the control valve 1000 according to an embodiment.

Referring to FIG. 2, the control valve 1000 includes a main body 1100, a control unit 1200, a load distributor 1300, at least one horizontal stud 1400, a cover 1500, and cover studs 1600.

The main body 1100 encases a vapor channel for supplying pressurized vapor from the evaporator 120 to the turbine 130. The control unit 1200 is disposed in the vapor channel of the main body 1100 and controls the amount of vapor that is supplied to the turbine 130.

The load distributor 1300 to be described below is disposed in an upper portion "SECTION A" of the main body 1100, between the main body 1100 and an upper surface of the control unit 1200, and functions to seal the upper portion of the main body 1100. Accordingly, each of the main body 1100 and the control unit 1200 may protrude, upward, farther than do corresponding components of a related art control valve. That is, each of the main body 1100 and the control unit 1200 includes an upward protrusion disposed toward the cover 1500 of the control valve 1000, and the load distributor 1300 is disposed between the upward protrusions.

The load distributor 1300 is disposed between the control unit 1200 and the main body 1100, thereby sealing the main body 1100 and distributing to the main body 1100 a load applied to the control unit 1200 by the pressured vapor in the vapor channel.

The load distributor 1300 will be described in detail.

Figure 3:
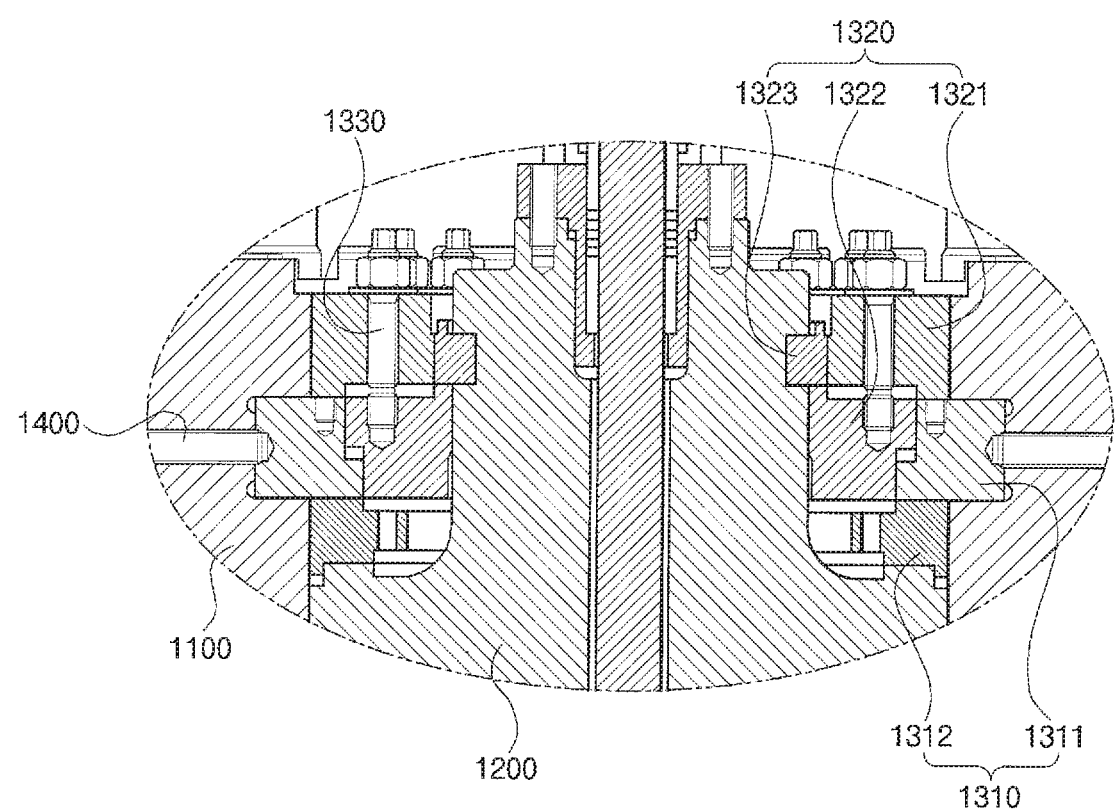
FIG. 3 is an enlarged cross-sectional view of an upper portion "SECTION A" of the control valve shown in FIG. 2.

FIG. 3 shows the upper portion of the control valve shown in FIG. 2.

Referring to FIG. 3, the load distributor 1300 may include a load distribution assembly 1310, a load return assembly 1320, and at least one vertical stud 1330. The load distribution assembly 1310 and the load return assembly 1320 each have a generally annular shape.

The load distribution assembly 310 is fitted to an inner side of the main body 1100 and distributes a load applied to the control unit to the main body 1100.

In detail, the load distribution assembly 1310 may include a first distribution member 1311 and a second distribution member 1312. As in the case of the load distribution assembly 1310 itself, each of the first distribution member 1311 and second distribution member 1312 is annular in shape.

The first distribution member 1311, which is disposed between the main body 1100 and the control unit 1200, is fitted to the inner side of the main body 1100 and distributes a load applied to the control unit to the main body 1100. The first distribution member 1311 may be disposed such that an outer side of the first distribution member 1311 is inserted into a surface of the inner side of the main body 1100.

The horizontal studs 1400 according to the embodiment are plural studs, but the present invention is not limited thereto. That is, the present invention includes at least one horizontal stud 1400. The first distribution member 1311 may be fixed to the inner side of the main body 1100 by the horizontal studs 1400, which are inserted into the outer side of the first distribution member 1311 from an outer side of the main body 1100. This configuration prevents the first distribution member 1311 from rotating with respect to the control unit 1200 or the main body 1100.

The second distribution member 1312, which is disposed in a space provided between the upper surface of the control unit 1200 and a bottom surface of the first distribution member 1311, transmits a load applied to the control unit to the first distribution member 1311. Here, a load applied to the second distribution member 1312 is transmitted to the first distribution member 1311.

More specifically, in order for a load applied to the control unit 1200 by the pressurized vapor to be distributed to the main body 1100, the applied load is sequentially transmitted to the control unit 1200, then to the second distribution member 1312, then to the first distribution member 1311, and then to the main body 1100. That is, a load is transmitted from the control unit 1200 to the load distribution assembly 1310 and then to the main body 1100.

The load return assembly 1320 is disposed between the control unit 1200 and the load distribution assembly 1310 and returns a portion of a load transmitted to the load distribution assembly 1310 back to the control unit 1200.

In detail, the load return assembly 1320 may include a first return member 1321, a second return member 1322, and a third return member 1323. As in the case of the load return assembly 1320 itself, each of the first return member 1321, second return member 1322, and third return member 1323 is annular in shape.

The first return member 1321 is disposed on the first distribution member 1311 and receives a portion of a load from the first distribution member 1311. The received portion is that part of a load which is not transmitted to the main body 1100 through the first distribution member 1311.

The second return member 1322 is disposed under the first distribution member 1321 and receives the portion of a load that is transmitted to the first return member 1321.

The third return member 1323 is disposed between the control unit 1200 and the first return member 1321 and has an inner side fitted to an outer side of the control unit 1200. Thus, the third return member 1323 is fitted to the control unit 1200, between the control unit 1200 and the first return member 1321, and receives a load transmitted to the second return member 1322. Here, a load transmitted to the second return member 1322 is the same portion transmitted to the first return member 1321. A load received from the second return member 1322 by the third return member 1323 is transmitted back to the control unit 1200. Thus, a load transmitted back to the control unit 1200 is the same portion transmitted to the first return member 1321.

The vertical studs 1330 according to the embodiment are plural studs, but the present invention is not limited thereto. That is, the present invention includes at least one vertical stud 1330. The first return member 1321 and the second return member 1322 may be fixed by the vertical studs 1330 inserted through the first return member 1321 and into the second return member 1322 from the top of the first return member 1321. The vertical studs 1330 may have a protrusion (not shown) that is inserted in the first return member 1321 and the second return member 1322 so that the vertical studs 1330 can be fixed to the first return member 1321 and the second return member 1322.

A force transmission mechanism in which the load distributor 1300 distributes a load applied to the control unit to the main body 1100 and returns a portion of a load back to the control unit 1200 will be described.

The vapor from the evaporator 120 is supplied to the turbine 1300 through the vapor channel in the main body 1100. The vapor in the vapor channel is pressurized and thus exerts pressure on the inner side of the main body 1100 and the control unit 1200. Accordingly, a load is applied upward to the control unit 1200.

When a load is applied to the control unit 1200 by the pressurized vapor, a load is transmitted first to the second distribution member 1312. The second distribution member 1312 transmits a load to the first distribution member 1311.

Assuming a magnitude of 100 for a load applied to the control unit 1200 by the pressurized vapor, the first distribution member 1311 receiving a load transmits a force (load) magnitude of, say, 90 to the main body 1100. This load transmission constitutes a distribution of a load, originally a force magnitude of 100, to the main body 1100. Therefore, the first distribution member 1311 transmits a remainder force magnitude of 10 to the first return member 1321.

The force magnitude of 10 is transmitted to the second return member 1322 from the first return member 1321 by the vertical studs 1330 and is subsequently transmitted to the third return member 1323 and then to the control unit 1200, so that, as a result, the force magnitude of 10 is returned to the control unit 1200. Consequently, only a load having a three magnitude of 10 is applied to the cover 1500 and the cover studs 1600.

Therefore, according to the control valve 1000 of an embodiment of the present invention, it is possible to markedly reduce a load that, in the related art, is applied to large cover studs of a control valve by pressurized vapor, and it is possible to decrease the respective sizes of a cover and cover studs accordingly.

In the above example, the three magnitude figures of 100, 90, and 10 are arbitrary figures introduced merely for the convenience of describing the transmission relationship of force by the load distributor 1300 according to an embodiment of the present invention. Accordingly, the actual magnitude of force transmitted may be differ significantly in accordance with characteristics of components of the load distributor 1300, such as their material, relative dimensions, and design structure.

A process of assembling the load distributor will be described in detail.

Figure 4:
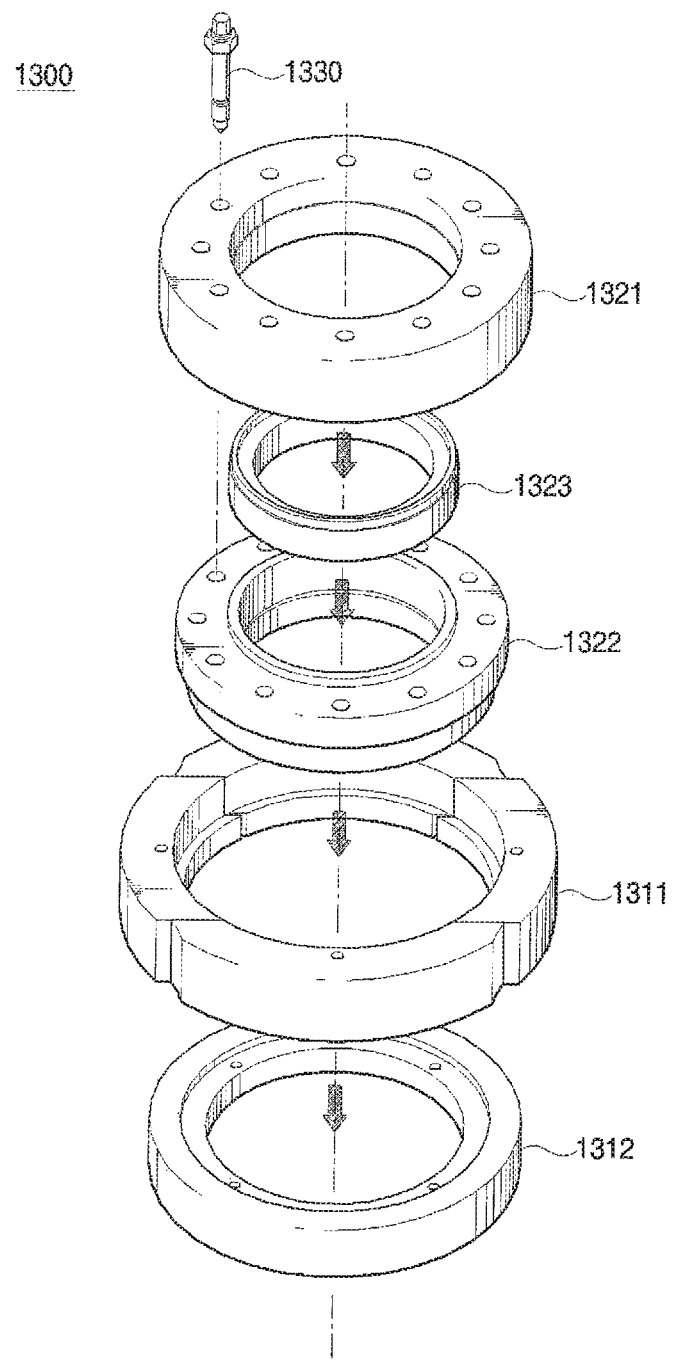
FIG. 4 is an exploded perspective view of the load distributor of FIG. 3.
Figure 5:
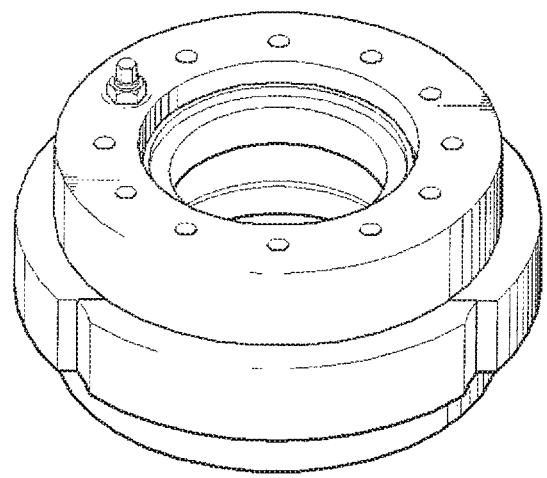
FIG. 5 is a perspective view of the load distributor shown in FIG. 4.

FIG. 4 shows the coupling relationships of the components of the load distributor 1300, and FIG. 5 shows the load distributor 1300 in assembled form.

Referring to FIGS. 4 and 5, the second distribution member 1312 is first mounted on the control unit 1200.

Next, the first distribution member 1311 is inserted in the main body 1100 such that the outer side thereof is inserted in the inner side of the main body 1100. The first distribution member 1311 is fixed to the main body 1100 by inserting the horizontal studs 1400 into the outer side of the first distribution member 1311 from the outer side of the main body 1100.

Next, the second return member 1322 is mounted between the control unit 1200 and the first distribution member 1311.

In detail, the lower portion of the inner side of the first distribution member 1311 may protrude radially inward and the upper portion of the outer side of the second return member 1322 may protrude radially outward. Thus, the second return member 1322 can be positioned between the control unit 1200 and the first distribution member 1311, with the inner side in contact with the outer side of the control unit 1200 and the outer side in contact with the inner side of the first distribution member 1311.

After the second return member 1322 is installed, the third return member 1323 is mounted on the second return member 1322 such that the inner side of the third return member 1323 is fitted to the outer side of the control unit 1200. Then, the first return member 1321 is mounted in the space between the main body 1100 and the third return member 1323, and is mounted on the second return member 1322, such that the inner side of first return member 1321 is brought in contact with the outer side of the third return member 1323.

Finally, the vertical studs 1330 are inserted into the first return member 1321 and the second return member 1322 from the top of the first return member 1321.

Accordingly, the load distributor 1300 can be completely installed between the control unit 1200 and the main body 1100.

As described above, according to the present invention, in contrast to a related art apparatus in which a load would be concentrated on the cover 1500 and the cover studs 1600, provision of the load distributor 1300 fitted between the control unit 1200 and the main body 1100 enables a load to be distributed to the main body 1100, thereby enabling a reduction in the respective sizes of the cover 1500 and the cover studs 1600.

What is claimed is:

1. A control valve comprising:
    a main body encasing a vapor channel configured to supply pressurized vapor from an evaporator to a turbine;
    a control unit, disposed in the vapor channel of the main body toward a cover of the control valve, for controlling an amount of vapor supplied to the turbine; and
    a load distributor, disposed between the control unit and the main body, for sealing the main body and for distributing to the main body a load applied to the control unit by the pressurized vapor in the vapor channel, the load distributor including a load distribution assembly fitted to an inner side of the main body, and a load return assembly disposed between the control unit and the load distribution assembly,
    wherein the load distribution assembly includes:
        a first distribution member (1311) that is fitted to the main body and includes a top surface disposed toward the cover and a bottom surface disposed opposite the top surface; and
        a second distribution member (1312) disposed between the bottom surface of the first distribution member and an upper surface of the control unit that faces the cover.

2. The control valve of claim 1, wherein the load distribution assembly is configured to receive a load applied to the control unit and to distribute the received load to the main body; and
    wherein the load return assembly is configured to return to the control unit a portion of the load received by the load distribution assembly.

3. The control valve of claim 2, wherein the second distribution member is configured to receive a load applied to the control unit.

4. The control valve of claim 3, wherein the first distribution member is configured to distribute to the main body a load applied to the control unit, by transmitting to the main body a portion of a load applied to the control unit.

5. The control valve of claim 3, wherein the second distribution member is configured to transmit the received load to the first distribution member.

6. The control valve of claim 3, wherein the load distribution assembly is configured to sequentially transmit a load applied to the control unit first to the second distribution member, then to the first distribution member, and then to the main body.

7. The control valve of claim 3, wherein the first distribution member has an outer side that includes an outer portion of the top and bottom surfaces and is inserted into a surface of the inner side of the main body.

8. The control valve of claim 3, further comprising:
    at least one horizontal stud, inserted into an outer side of the first distribution member from an outer side of the main body, to fix the first distribution member to the main body.

9. The control valve of claim 3, wherein the first and second distribution members each have an annular shape.

10. The control valve of claim 3,
    wherein the second distribution member is configured to transmit the received load to the first distribution member, and
    wherein the load return assembly includes:
        a first return member, disposed on the first distribution member, to receive a portion of a load transmitted to the first distribution member;
        a second return member, disposed under the first return member, to receive from the first return member the portion of a load transmitted to the first distribution member; and
        a third return member, disposed between the first return member and the control unit, to receive from the second return member the portion of a load transmitted to the first distribution member.

11. The control valve of claim 10, wherein the third return member is configured to transmit the portion of a load transmitted to the first distribution member back to the control unit.

12. The control valve of claim 10,
wherein the first return member is configured to transmit the received portion of a load from the first distribution member to the second return member, and
wherein the second return member is configured to transmit the received portion of a load from the first return member to the third return member.

13. The control valve of claim 10, the load distributor further includes at least one vertical stud inserted in the first return member and the second return member from a top of the first return member and fixing the first return member and the second return member.

14. The control valve of claim 10,
wherein the first return member has a lower portion protruding inwardly, and the second return member has an upper portion protruding outwardly, and
wherein the second return member has an inner side in contact with an outer side of the control unit, and an outer side in contact with an inner side of the first distribution member.

15. The control valve of claim 10, wherein the first return member is disposed in a space between the main body and the third return member, such that an inner side of first return member makes contact with an outer side of the third return member.

16. The control valve of claim 10, wherein the third return member has an inner side fitted to an outer side of the control unit.

17. The control valve of claim 10, wherein the first, second, and third return members each have an annular shape.

18. The control valve of claim 1,
wherein each of the main body and the control unit includes an upward protrusion disposed toward the cover of the control valve, and
wherein the load distributor is disposed between the upward protrusions of the main body and the control unit.

19. A power generation system comprising:
an evaporator to produce vapor by receiving thermal energy and evaporating condensate water;
a turbine to generate power for generating electricity by passing the produced vapor through the turbine;
a condenser to condense the vapor having passed through the turbine;
a pump to supply the evaporator with condensate water produced by the condenser; and
a control valve including:
a main body encasing a vapor channel configured to supply pressurized vapor from an evaporator to a turbine;
an control unit, disposed in the vapor channel of the main body toward a cover of the control valve, for controlling an amount of vapor supplied to the turbine; and
a load distributor, disposed between the control unit and the main body, for sealing the main body and for distributing to the main body a load applied to the control unit by the pressurized vapor in the vapor channel, the load distributor including a load distribution assembly fitted to an inner side of the main body, and a load return assembly disposed between the control unit and the load distribution assembly,
wherein the load distribution assembly includes:
a first distribution member (1311) that is fitted to the main body and includes a top surface disposed toward the cover and a bottom surface disposed opposite the top surface; and
a second distribution member (1312) disposed between the bottom surface of the first distribution member and an upper surface of the control unit that faces the cover.

20. The power generation system of claim 19, further comprising:
a boiler to produce the thermal energy by expending a supplied fuel, wherein the supplied fuel is one of a fossil fuel and a nuclear fuel.

* * * * *